United States Patent
Han

(10) Patent No.: US 7,336,750 B1
(45) Date of Patent: Feb. 26, 2008

(54) OPTIMAL ONE-SHOT PHASE AND FREQUENCY ESTIMATION FOR TIMING ACQUISITION

(75) Inventor: Ke Han, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 760 days.

(21) Appl. No.: 10/621,755

(22) Filed: Jul. 16, 2003

Related U.S. Application Data

(60) Provisional application No. 60/434,584, filed on Dec. 17, 2002, provisional application No. 60/428,507, filed on Nov. 22, 2002.

(51) Int. Cl.
*H04L 7/04* (2006.01)

(52) U.S. Cl. .................. 375/362; 375/355; 375/354

(58) Field of Classification Search ............... 375/362, 375/354, 355; 360/39
See application file for complete search history.

(56) References Cited

U.S. PATENT DOCUMENTS

| | | | |
|---|---|---|---|
| 5,619,537 A | | 4/1997 | Altes |
| 5,805,619 A | * | 9/1998 | Gardner et al. ............. 714/814 |
| 5,935,177 A | * | 8/1999 | Cox et al. ................... 701/9 |
| 6,064,703 A | | 5/2000 | Cusani et al. |
| 6,192,501 B1 | | 2/2001 | Hladik et al. |
| 6,219,391 B1 | * | 4/2001 | Nakano ...................... 375/346 |
| 6,304,996 B1 | | 10/2001 | Van Stralen et al. |
| 6,343,368 B1 | | 1/2002 | Lerzer |
| 6,590,972 B1 | * | 7/2003 | Lu et al. ...................... 379/283 |
| 2002/0064246 A1 | * | 5/2002 | Kelkar et al. ............... 375/347 |
| 2002/0150037 A1 | * | 10/2002 | Bao et al. .................... 370/208 |
| 2002/0167923 A1 | | 11/2002 | Sendonaris et al. |

OTHER PUBLICATIONS

Sklar (Digital Communications Fundamentals and Applications, Prentice Hall; US Ed edition (Oct. 1, 1987), pp. 27 and 28).*
Bergmans, Jan W.M., "Appendix 9C: Data-aided Maximum-likelihood one-shot phase estimator", *Digital Baseband Transmission and Recording*, 1996, pp. 489-494, Kluwer Academic Publishers, Netherlands.
Liu, Jingfeng et al., "Symbol Timing Recovery for Low-SNR Partial Response Recording Channels," Globecom Conference, 2002, 8 pp. Pittsburgh, Pennsylvania.

* cited by examiner

*Primary Examiner*—Mohammed Ghayour
*Assistant Examiner*—Leila Malek

(57) ABSTRACT

A method and system for an optimal one-shot estimate of phase and frequency for timing acquisition employ a maximum a posteriori (MAP) formulation to calculate a cost function that is a function of an estimated frequency and an estimated phase. A plurality of cost functions are calculated each using a different estimated frequency and a different estimated phase, and the minimum value cost function is selected. The estimated frequency and estimated phase values are selected from a range of frequency and phase values. The minimum value cost function corresponds to the optimum frequency and the optimum phase.

24 Claims, 6 Drawing Sheets

OPTIMAL ONE-SHOT PHASE AND FREQUENCY ESTIMATION FOR TIMING ACQUISITION

CROSS-REFERENCE TO RELATED APPLICATIONS

This application claims the benefit of Provisional Application No. 60/428,507, filed Nov. 22, 2002, and Provisional Application No. 60/434,584, filed Dec. 17, 2002. This application incorporates these provisional applications by reference.

BACKGROUND OF THE INVENTION

1. Field of the Invention

The present invention relates generally to timing acquisition in a data stream. More particularly, the invention is directed to a method and apparatus for estimating the phase and the frequency for timing acquisition of a data stream.

2. Description of the Related Art

In electronic communications systems, during signal transmission, transmitted signals may be subject to noise. The received signal will be a combination of the original signal and the noise. The received signal data may be represented as the sum of the original signal and a noise component as follows:

$$x = f(t) + n(t) \quad \text{EQ 1}$$

where: f(t) is the original signal, and n(t) is noise.

The electronic communications system must be able to extract the information contained in the transmitted signal, even in the presence of noise.

In communications channels, data often is preceded by a preamble which has a fixed length of a known bit sequence. Sampling the preamble provides timing characteristics of the communications channel to enable receipt of the digital data.

The sampled preamble, $\overline{X}$, may be represented by the following:

$$\overline{X} = [x_O \ldots x_N] \quad \text{EQ 2}$$

where $$x_k = A \sin\left(\Phi + k \cdot f \cdot \frac{\pi}{2}\right) + n_k \quad \text{EQ 3}$$

A is the signal amplitude,
k is a sample point,
$\Phi$ is the phase of the data signal,
f is the frequency, and
$n_k$ is channel noise.

The sampled preamble is then estimated, resulting in the following approximation, $\overline{Y}$ being the estimated preamble:

$$\overline{Y} = [y_O \ldots y_N] \quad \text{EQ 4}$$

where $$y_k = \hat{A} \sin\left(\hat{\Phi} + k \cdot \hat{f} \cdot \frac{\pi}{2}\right) \quad \text{EQ 5}$$

$\hat{A}$ is an estimated signal amplitude,
$\hat{\Phi}$ is an estimated phase, and
$\hat{f}$ is an estimated frequency.

Data may be transmitted reliably over the data channel when, after processing the preamble samples, the phase estimate is within 1% of the actual phase, and the frequency estimate is within 0.1%, preferably within 0.05% of the actual frequency. Traditionally, in the presence of a large frequency offset (a difference between the frequency estimate and the actual frequency), a preamble of sufficient length is required in order to have good frequency acquisition before the channel switches into the data mode. Often it is necessary to engage in a trade-off between timing loop bandwidth and the preamble length regarding the frequency acquisition. However there is a limit to such a compromise. For example, stability is a problem when the bandwidth is too large, especially when the timing loop delay cannot be ignored. Also, large bandwidth admits more noise, causing large jitters in the timing loop.

To improve the format efficiency of the digital data, it is desirable to have the preamble be as short as possible.

SUMMARY OF THE INVENTION

A Maximum Likelihood Estimation (MLE) technique may determine the components of the estimated preamble. Assuming the communication channel noise is white and has a normal distribution, then the MLE of the amplitude, phase and frequency involves finding $\hat{A}$, $\hat{\Phi}$, and $\hat{f}$ so as to minimize the squared difference between the sampled preamble and the estimated preamble.

$$\|\hat{X} - \hat{Y}\|^2 = \sum_{k=0}^{N-1} (x_k - y_k)^2 \quad \text{EQ 6}$$

The accuracy of the MLE of the frequency is dependent upon the number of samples and the communication channel signal-to-noise ratio (SNR). However, the MLE does not utilize any pre-knowledge regarding the distribution of the random frequency. As a result, a longer preamble is necessary. That is, the MLE assumes that all frequencies are equally probable, which is not true in practical cases. As a result, a long preamble may be necessary.

It is also possible to address the problem of efficient frequency estimation with a maximum a posteriori (MAP) formulation where the frequency has a normal distribution and a mean of zero. Mathematically, the MAP estimation can be expressed as follows: a symbol a, belonging to the set A, is transmitted according to a probability of $P_A(a)$, and an output, y, is observed. Then the MAP estimation involves finding a possible transmitted symbol, â, to maximize the following probability.

$$P_{A|Y}(\hat{a}|y) = \frac{P_{Y|A}(y|\hat{a}) P_A(\hat{a})}{P_Y(y)} \quad \text{EQ 7}$$

Since $P_Y(y)$ is not a function of â, it only is necessary to maximize $P_{Y|A}(y|\hat{a}) P_A(\hat{a})$ as a function of â.

EQ 1 expresses the received samples of the preamble waveform, and EQ 2 expresses the estimated samples of the preamble waveform. The MAP estimation of the frequency involves choosing $\hat{f}$ to maximize the following:

$$P_{F|X}(\hat{f} \mid \tilde{X}) = \frac{P_{X|F}(\overline{X} \mid \hat{f}) P_F(\hat{f})}{P_X(\overline{X})} \qquad \text{EQ 8}$$

By assuming the channel noise has a normal distribution with a mean of zero, the frequency also has a normal distribution. Each of $P_{X|F}(\overline{X})$ and $P_F(\hat{f})$ are represented as follows:

$$P_{X|F} = \frac{1}{\sigma^N \sqrt{(2\pi)^N}} \cdot \exp\left(-\frac{\|\overline{X} - \overline{Y}(\hat{f})\|^2}{2\sigma^2}\right) \text{ and} \qquad \text{EQ 9}$$

$$P_F(\hat{f}) = \frac{1}{\sigma_f \sqrt{2\pi}} \cdot \exp\left(-\frac{(\hat{f} - \overline{f})^2}{2\sigma_f^2}\right), \qquad \text{EQ 10}$$

where $\overline{f}$ is the nominal frequency. The term, $\hat{f} - \overline{f}$, is the frequency offset.

The cost function, $C(\hat{f})$, is found by taking the logarithm of both sides of EQ 10 and discarding any terms that are independent of $\hat{f}$, as follows:

$$C(\hat{f}) = \ln(P_{F|X}(\hat{f}|\overline{X})) + \ln(P_F(\hat{f})) \qquad \text{EQ 11}$$

and $$C(\hat{f}) = \frac{\|\overline{X} - \overline{Y}(\hat{f})\|^2}{\sigma^2} + \frac{(\hat{f} - \overline{f})^2}{\sigma_f^2}. \qquad \text{EQ 12}$$

Therefore the MAP estimation of the frequency is transformed into choosing $\hat{f}$ to maximize the cost function, $C(\hat{f})$.

DETAILED DESCRIPTION OF EMBODIMENTS

Figure 5:
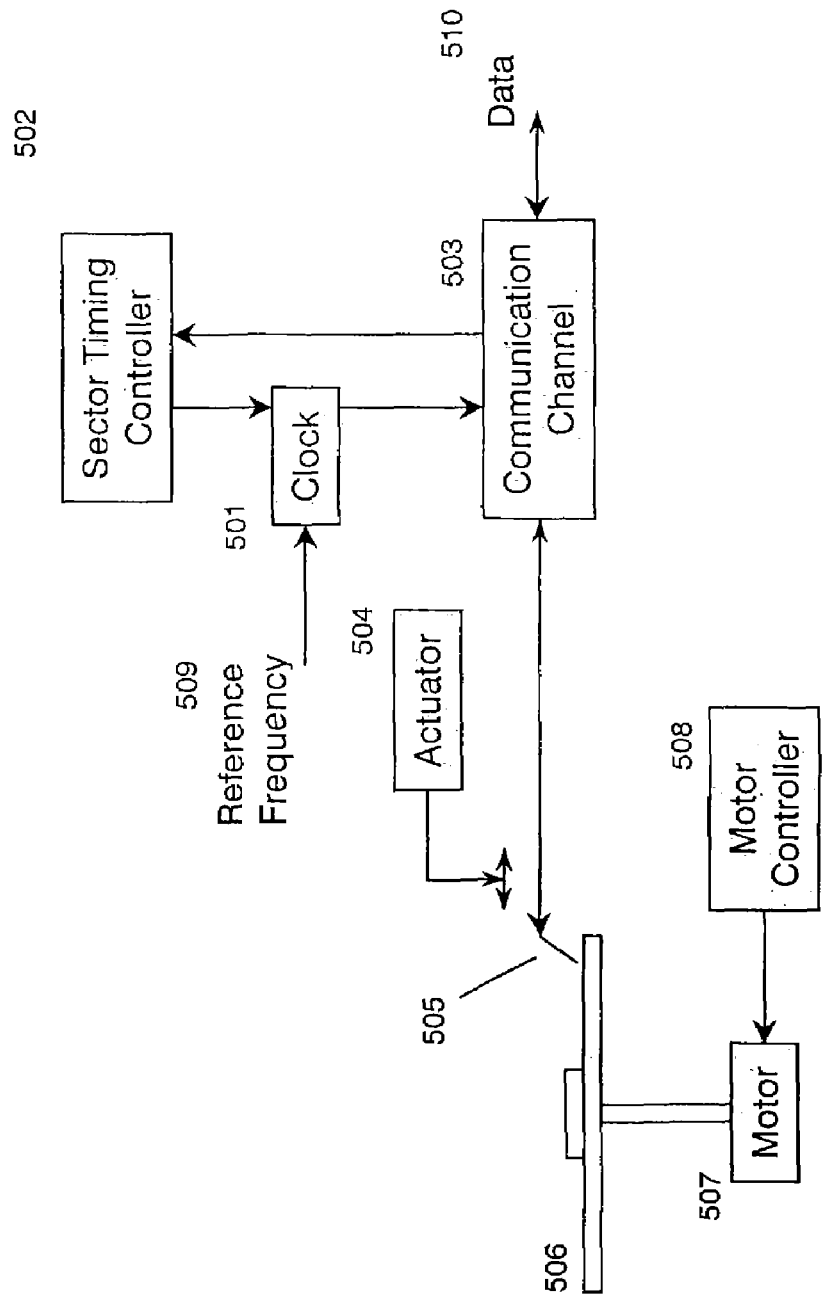
FIG. 5 shows a schematic representation of a disk drive system having a communications channel for estimating the phase and frequency of a preamble.

As shown on FIG. 5, an exemplary hard disk drive system comprises a disk 506. A motor 507 spins the disk 506 at a substantially constant speed and under control of a motor controller 508. An actuator 504 positions a recording head 505 over the proper data track on the disk 506. Data is transmitted through the recording head 505 via a communications channel 503. A clock 501 responsive to a reference frequency 509 provides timing signals to the communications channel 503. The sector timing controller 502 synchronizes the clock 501 with the disk rotation. Skilled practitioners in the art will recognize that other disk drive configurations are possible.

When a digital communication channel is a read channel for a hard disk drive, a signal preamble may comprise a known series of bits written at the beginning of each data sector. The series of bits, comprising one or more preamble words, enables quick and accurate determination of frequency and phase information. For example, preamble word "0011" will provide a single cycle of a sinusoidal waveform. A number of preamble words, read as a data stream, will provide a preamble having a sinusoidal waveform. Because the preamble comprises a sinusoidal waveform derived from a known bit stream rather than random data bits, the frequency and phase values are more easily determined. The frequency and phase information are required to accurately read data from the disk.

Preambles take up space on a disk surface. As a result, the shorter the preamble, the more room there is for data storage. Therefore, it is important to determine the frequency and phase values to the required accuracy from a preamble having the shortest possible length.

The preamble is sampled at the communication channel clock rate, that is, a sample of the preamble is taken each time a bit is transmitted. Therefore, the preamble word "0011" will be sampled four times, and the total preamble sample size, N, will be four times the number of preamble words. The sampled preamble then is used to estimate the waveform, and the estimated waveform provides estimates for the phase and frequency.

The MAP estimation of the frequency cost function presented in EQ 12 may be rewritten and expanded to include the estimated variables for the amplitude and the phase as follows:

$$C(\hat{A}, \hat{\Phi}, \hat{f}) = \|\overline{X} - \overline{Y}(\hat{A}, \hat{\Phi}, \hat{f})\|^2 + \frac{\sigma^2 \cdot (\hat{f} - \overline{f})^2}{\sigma_f^2} = \qquad \text{EQ 13}$$

$$\sum_{k=0}^{N-1} \left(x_k - \hat{A}\sin\left(\hat{\Phi} + k \cdot \hat{f} \cdot \frac{\pi}{2}\right)\right)^2 + \frac{\sigma^2 \cdot (\hat{f} - \overline{f})^2}{\sigma_f^2} =$$

$$\sum_{k=0}^{N-1} x_k^2 + \hat{A}^2 \sum_{k=0}^{N-1} \sin^2\left(\hat{\Phi} + k \cdot \hat{f} \cdot \frac{\pi}{2}\right) -$$

$$2\hat{A} \sum_{k=0}^{N-1} x_k \sin\left(\hat{\Phi} + k \cdot \hat{f} \cdot \frac{\pi}{2}\right) + \frac{\sigma^2 \cdot (\hat{f} - \overline{f})^2}{\sigma_f^2}$$

The first term is not a function of the parameters under consideration, and is omitted when calculating a value for the cost function.

The amplitude estimate, $\hat{A}$, may be determined by the square root of the sum of the squares of the average of the even samples and the average of the odd samples. The amplitude estimate, $\hat{A}$, may be represented as follows:

$$s = \frac{2}{N} \cdot \sum_{k=0}^{\frac{N}{2}-1} (-1)^k \cdot x_{2k}, \text{ (average of the even samples)} \qquad \text{EQ 14}$$

-continued $$c = \frac{2}{N} \cdot \sum_{k=0}^{\frac{N}{2}-1} (-1)^k \cdot x_{2k+1}, \text{ (average of the odd samples)} \quad \text{EQ 15}$$

and $$\hat{A} = \sqrt{s^2 + c^2} \quad \text{EQ 16}$$

where x is a preamble sample as shown in EQ 2.

Figure 1:
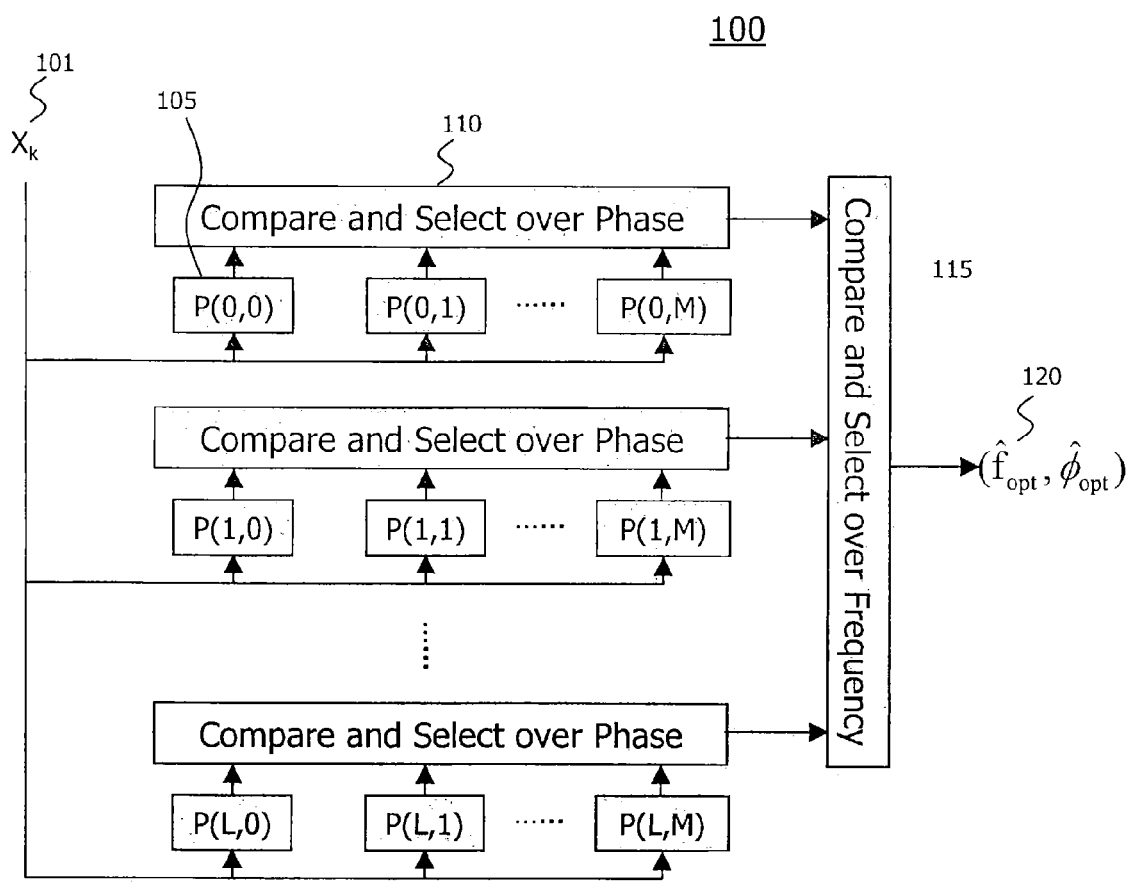
FIG. 1 shows a block diagram of one embodiment of parallel optimization of the frequency and the phase values.

The cost function of EQ 13 is evaluated over a range of possible phase values and a range of possible frequency, preferably substantially simultaneously, to determine the combination of phase and frequency that yield the minimum value of the cost function. FIG. 1 shows one embodiment.

Figure 4:
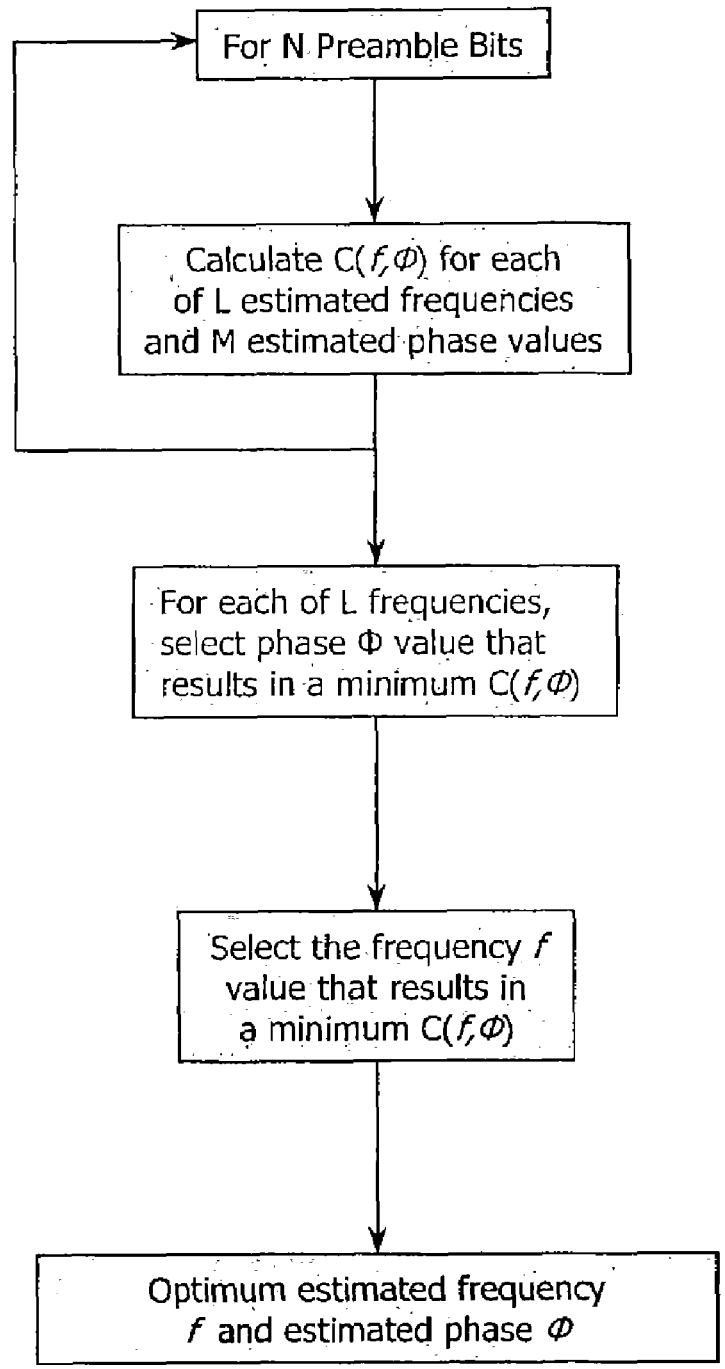
FIG. 4 contains a flow chart showing the steps of one embodiment.

FIG. 4 shows a flowchart containing the steps to implement one embodiment of the invention. As the N bits of the preamble are read from the communications channel, each bit is sampled and simultaneously processed by an array of L×M processing units. Each processing unit processes a respective sampled bit as it arrives, and evaluates the cost function using a different frequency and phase value. After reading the sampled preamble, each processing unit has calculated the cost function for a particular combination of phase and frequency. Once the cost functions are calculated, a minimum cost function is selected for each phase value. The overall minimum cost function is selected from this subset of minimum value cost functions, thereby providing an optimum value for frequency and for phase.

Referring now to FIG. 1, N samples of the preamble, $x_k$ 101, are received from the communication channel and are processed in parallel by processing units 105 to evaluate the cost function as described in EQ 13. The cost function is evaluated for each of L distinct and different frequency values and M distinct and different phase values. There are L×M processing units 105, each capable of evaluating the cost function for a distinct value for the phase and a distinct value for the frequency. The range of values for the frequency is $-4\sigma_f$ to $+4\sigma_f$ with steps of $$\frac{\sigma_f}{4}.$$

The phase value has a range of 0 to $2\pi$ with 5% increments. Therefore, the embodiment of FIG. 1 has 33 different frequency values and 21 different phase values. Other values for L and M are possible. The chosen increments need not be equal.

When the N samples of the preamble are processed, each of the L phase comparison means 110 will examine the M processing units 105 having the same frequency value, and will select the processing unit having a first minimum cost function. Then, the frequency comparison means 115 will examine the plurality of L processing units having the first minimum cost functions, and will select a second minimum cost function. This second minimum cost function has the optimum estimated values 120 for both the frequency, $\hat{f}_{opt}$, and phase, $\hat{\Phi}_{opt}$. These optimum values then will be used to receive the remainder of the data stream.

Figure 6:
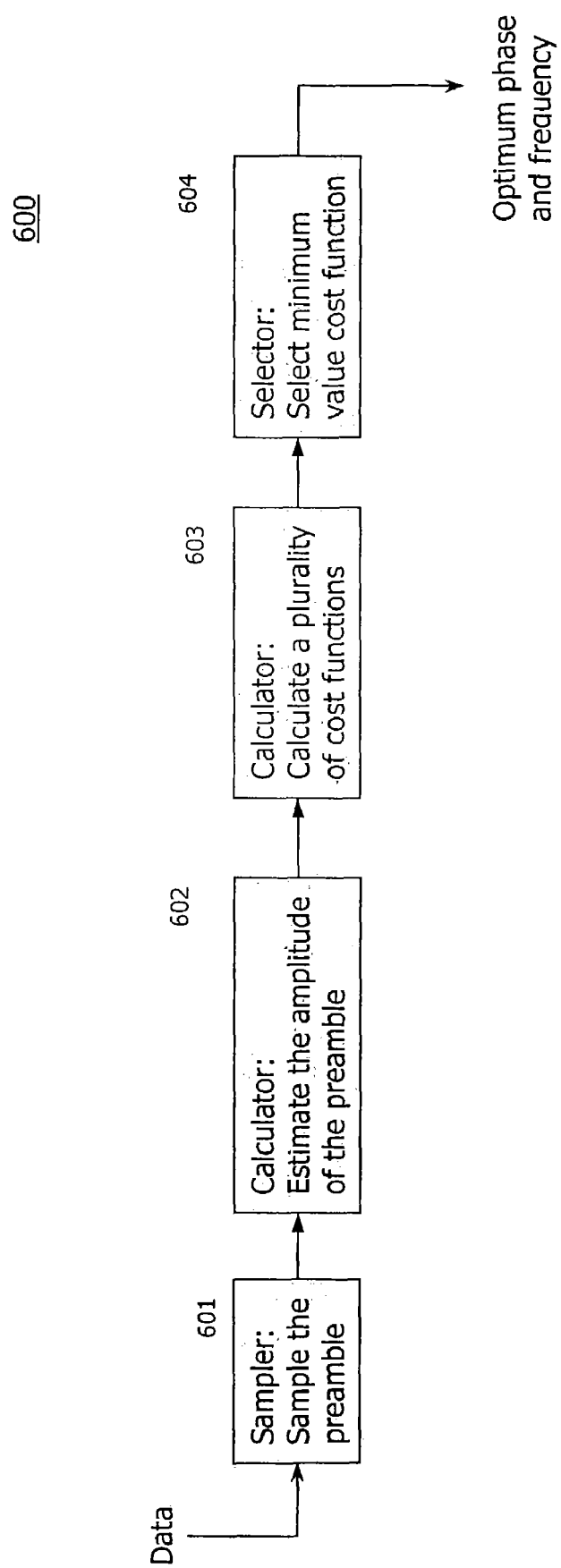
FIG. 6 shows a block diagram of a communication channel for estimating the phase and frequency of a preamble.

FIG. 6 shows a block diagram of an embodiment for determining the optimum estimates for the phase and frequency of a preamble. A sampler 601 samples each bit of the preamble (the preamble being a string of predetermined bits resulting in a sinusoidal waveform.) A first calculator 602 reads the preamble samples and estimates the preamble amplitude, Â. A second calculator 603 then computes the value of the cost function, $C(\hat{A}, \hat{\Phi}, \hat{f})$, for each of L different frequency values and M different phase values. Alternatively, the first calculator 602 and the second calculator 603 may operate substantially in parallel. A selector 604 the selects the cost function having the minimum value, thereby determining the optimum frequency and phase values.

Figure 2:
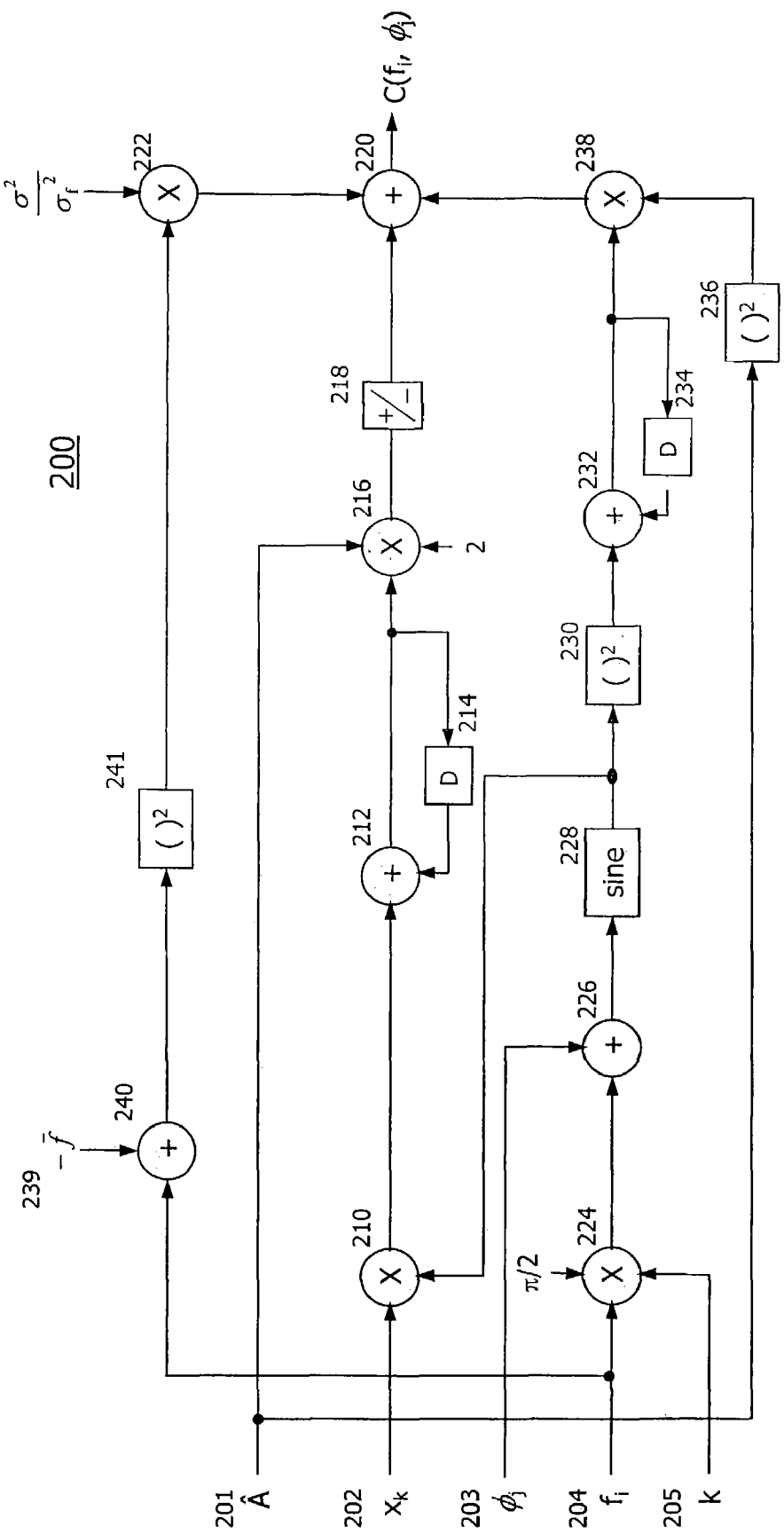
FIG. 2 shows a more detailed embodiment of the processing units shown in FIG. 1.

FIG. 2 shows further detail for each processing unit P(i,j) 105 of FIG. 1 for determining the cost function for each of the distinct frequency values $f_i$, and phase values $\Phi_j$. The frequency value $f_i$ 204 is multiplied by the integer k 205 and the scalar $$\frac{\pi}{2}$$

at the multiplier 224. The result is summed with the phase value $\Phi_j$ 203 at the adder 226. The result of the adder 226 is the input to the sine function 228, whose result is squared at the square function 230, and is multiplied with the $k^{th}$ sample of the preamble waveform, $x_k$ 202, at multiplier 210. The results of the square function 230 are summed for all k values 205 at the summer 232 and summation loop 234. The scalar Â 201 is squared at the square function 236 and is multiplied with the result of the summer 232 and summation loop 234 at multiplier 238. The result of multiplier 238 represents $$\hat{A}^2 \sum_{k=0}^{N-1} \sin^2(\hat{\Phi} + k \cdot \hat{f} \cdot \frac{\pi}{2}).$$

The result of the multiplier 210 is summed for all k values at summer 212 and summation loop 214. The results of the summer 212 and summation loop 214 are multiplied with the scalar Â and the scalar 2 at multiplier 216. The result of the multiplier 216 is changed in sign at the sign complement 218. The result of the sign complement 218 represents $$-2\hat{A} \sum_{k=0}^{N-1} x_k \sin(\hat{\Phi} + k \cdot \hat{f} \cdot \frac{\pi}{2}).$$

The nominal frequency, $\tilde{f}$, 239 is subtracted from the frequency value, $f_i$, 204 at summer 240. The result of summer 240 is first squared at the square function 241, and then the result is multiplied by the scalar $$\frac{\sigma^2}{\sigma_f^2}$$

at multiplier 222. The cost function, $C(f_i, \Phi_j)$, is the result of summer 220, which sums the results of multiplier 222, the sign complement 218, and the multiplier 238. The scalars $\sigma$ and $\sigma_f$ represent parameters of the communication channel; $\sigma$ is the standard deviation of the noise, and $\sigma_f$ is the standard deviation of the frequency. Both are assumed to have normal distributions with a mean of zero.

Figure 3:
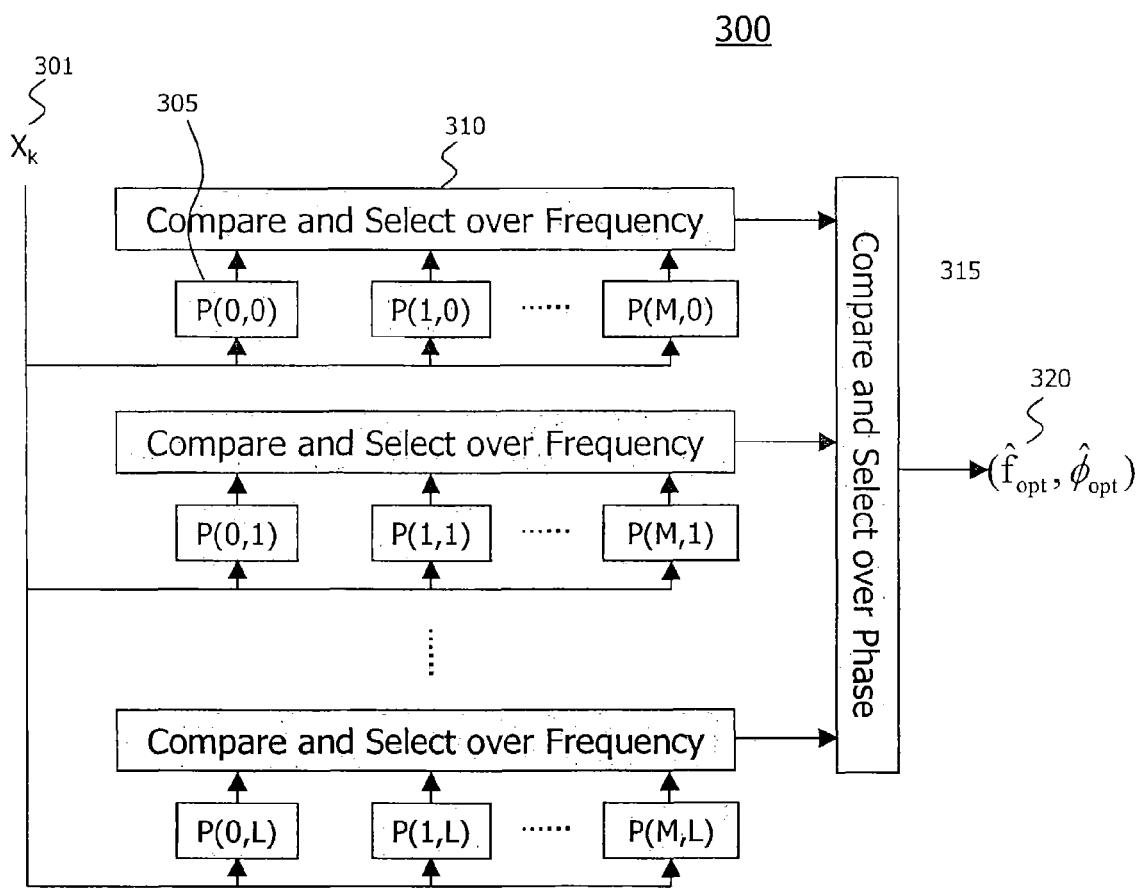
FIG. 3 shows a block diagram of a second embodiment of parallel optimization of the frequency and the phase values.

In another embodiment, shown in FIG. 3, when the N preamble samples 301 are processed, each of the L frequency comparison means 310 will examine the M processing units 305 having the same phase value, and will select the processing unit having the first minimum cost function. The phase comparison means 315 then will examine each of the M processing units 305 having a first minimum cost function, and will select the processing function having the second minimum cost function. The second minimum cost function has the optimum estimated values 320 for the frequency; $\hat{f}_{opt}$, and phase, $\hat{\Phi}_{opt}$. This embodiment differs from the previous embodiment in that for each frequency value, the minimum cost function is selected first as a function of phase, and then as a function of frequency. Those skilled in the art will recognize other possible means to select the processing unit having the minimum cost function representing the optimal estimates for the frequency, $\hat{f}_{opt}$, and phase, $\hat{\Phi}_{opt}$.

To demonstrate that minimizing the cost function as a function of frequency and phase will provide an improvement in the acquisition of an estimated frequency, a MATLAB simulation was performed, wherein the channel noise, length of the preamble sample, and the standard deviation of the frequency were varied. The following table presents the results of the simulation.

TABLE 1

| Bit Error Rate (BER) | Number of Samples | Number of Trials | Initial Frequency Offset Standard Deviation ($\sigma_f$) | Residual Frequency Offset Standard Deviation ($\hat{\sigma}_f$) |
|---|---|---|---|---|
| 1e-4 | 32 | 10,000 | 0.03% | 0.0300% |
| 1e-4 | 64 | 10,000 | 0.03% | 0.0285% |
| 1e-4 | 128 | 1,000 | 0.03% | 0.0210% |
| 1e-4 | 32 | 1,000 | 0.3% | 0.2000% |
| 1e-4 | 64 | 1,000 | 0.3% | 0.0844% |
| 1e-4 | 128 | 1,000 | 0.3% | 0.0326% |
| 1e-3 | 32 | 1,000 | 1.0% | 0.28% |
| 1e-3 | 64 | 1,000 | 1.0% | 0.10% |
| 1e-3 | 128 | 1,000 | 1.0% | 0.0465% |

The BER is related to the standard distribution of the communication channel noise. For example, if the binary bits are taken from the se $\{0,1\}$, and the communications channel has a transfer function of $T(D)=4+3D-2D^2-3D^3-2D^4$, then a BER OF 1e-4 corresponds to a $\sigma$ of 0.7131, and a BER of 1e-3 corresponds to a $\sigma$ of 0.8562. The residual frequency standard deviation is the standard deviation of the resultant frequency estimates, $\hat{f}$, for the number of simulation trials run at the various conditions. The simulation results indicate that MAP estimation provides substantial improvement in the presence of large frequency standard deviations.

While the foregoing describes embodiments of the invention in detail, various omissions, substitutions, and changes in the form and details of the invention are possible for those skilled in the art, without departing from the spirit of the invention. Skilled practitioners will recognize that the invention may be implemented using hardware, software, or a combination of both to achieve the results as described above.

What is claimed is:

1. A method for an optimal one-shot phase and frequency estimation for timing acquisition for signals transmitted over a communications channel, the method comprising:
    sampling a preamble comprising a known string of data bits;
    estimating the sampled preamble (Y), the estimated preamble further comprising an estimated amplitude ($\hat{A}$), an estimated frequency ($\hat{f}$), and an estimated phase ($\hat{\Phi}$);
    calculating a cost function (C($\hat{f}$, $\hat{\Phi}$)) as a function of the estimated frequency ($\hat{f}$) and the estimated phase ($\hat{\Phi}$);
    varying at least one of the estimated frequency ($\hat{f}$) or estimated phase ($\hat{\Phi}$) to calculate a plurality of cost functions; and
selecting the cost function (C($\hat{f}$, $\hat{\Phi}$)) having a minimum value, wherein said cost function having the minimum value is a function of an optimal estimated frequency ($\hat{f}$) and an optimal estimated phase ($\hat{\Phi}$), wherein selecting the minimum value cost function further comprises selecting a plurality of first minimum cost functions such that each of the first minimum cost functions has a different estimated frequency ($\hat{f}$).

2. The method of claim 1, wherein selecting the minimum value cost function further comprises selecting a second minimum cost function from the plurality of first minimum cost functions, and wherein the second minimum cost function is a function of an optimal estimated frequency ($\hat{f}$) and an optimal estimated phase ($\hat{\Phi}$).

3. A method for an optimal one-shot phase and frequency estimation for timing acquisition for signals transmitted over a communications channel, the method comprising:
    sampling a preamble comprising a known string of data bits;
    estimating the sampled preamble (Y), the estimated preamble further comprising an estimated amplitude ($\hat{A}$), an estimated frequency ($\hat{f}$), and an estimated phase ($\hat{\Phi}$);
    calculating a cost function (C($\hat{f}$, $\hat{\Phi}$)) as a function of the estimated frequency ($\hat{f}$) and the estimated phase ($\hat{\Phi}$);
    varying at least one of the estimated frequency ($\hat{f}$) or estimated phase ($\hat{\Phi}$) to calculate a plurality of cost functions; and
selecting the cost function (C($\hat{f}$, $\hat{\Phi}$)) having a minimum value, wherein said cost function having the minimum value is a function of an optimal estimated frequency ($\hat{f}$) and an optimal estimated phase ($\hat{\Phi}$), wherein selecting the minimum value cost function further comprises selecting a plurality of first minimum cost functions such that each of the first minimum cost functions has a different estimated phase ($\hat{\Phi}$).

4. The method of claim 3, wherein selecting the minimum value cost function further comprises selecting a second minimum cost function from the plurality of first minimum cost functions, and wherein the second minimum cost function is a function of an optimal estimated frequency ($\hat{f}$) and an optimal estimated phase ($\hat{\Phi}$).

5. A communications channel for an optimal one-shot phase and frequency estimation for timing acquisition for signals transmitted over the communications channel, the communications channel comprising:
    a sampler for sampling a preamble comprising a known string of data bits;
    a first calculator for estimating the sampled preamble (Y), the estimated preamble further comprising an estimated amplitude ($\hat{A}$), an estimated frequency ($\hat{f}$), and an estimated phase ($\hat{\Phi}$);
    a second calculator for calculating a plurality of cost functions (C($\hat{f}$, $\hat{\Phi}$)) as a function of the estimated frequency ($\hat{f}$) and the estimated phase ($\hat{\Phi}$) by varying at least one of the estimated frequency ($\hat{f}$) or estimated phase ($\hat{\Phi}$); and
    a selector for determining the cost function (C($\hat{f}$, $\hat{\Phi}$)) having a minimum value, wherein said cost function having the minimum value is a function of an optimal estimated frequency ($\hat{f}$) and an optimal estimated phase ($\hat{\Phi}$), wherein the selector determines the minimum value cost function by selecting a plurality of first minimum cost functions such that each of the first minimum cost functions has a different estimated frequency ($\hat{f}$).

6. The communications channel of claim 5, wherein the selector determines the minimum value cost function by selecting a second minimum cost function from the plurality of first minimum cost functions, and wherein the second minimum cost function is a function of an optimal estimated frequency ($\hat{f}$) and an optimal estimated phase ($\hat{\Phi}$).

7. A communications channel for an optimal one-shot phase and frequency estimation for timing acquisition for signals transmitted over the communications channel, the communications channel comprising:
- a sampler for sampling a preamble comprising a known string of data bits;
- a first calculator for estimating the sampled preamble ($\hat{Y}$), the estimated preamble further comprising an estimated amplitude ($\hat{A}$), an estimated frequency ($\hat{f}$), and an estimated phase ($\hat{\Phi}$);
- a second calculator for calculating a plurality of cost functions (C($\hat{f}$, $\hat{\Phi}$)) as a function of the estimated frequency ($\hat{f}$) and the estimated phase ($\hat{\Phi}$) by varying at least one of the estimated frequency ($\hat{f}$) or estimated phase ($\hat{\Phi}$); and
- a selector for determining the cost function (C($\hat{f}$, $\hat{\Phi}$)) having a minimum value, wherein said cost function having the minimum value is a function of an optimal estimated frequency ($\hat{f}$) and an optimal estimated phase ($\hat{\Phi}$), wherein the selector determines the minimum value cost function by selecting a plurality of first minimum cost functions such that each of the first minimum cost functions has a different estimated phase ($\hat{\Phi}$).

8. The communications channel of claim 7, wherein the selector determines the minimum value cost function by selecting a second minimum cost function from the plurality of first minimum cost functions, and wherein the second minimum cost function is a function of an optimal estimated frequency ($\hat{f}$) and an optimal estimated phase ($\hat{\Phi}$).

9. A disk drive system for an optimal one-shot phase and frequency estimation for timing acquisition for signals transmitted over a communications channel, the system comprising:
- rotating magnetic media for storing data;
- a motor for rotating the magnetic media;
- a recording head for transmitting data;
- an actuator for positioning the recording head; and
- a communications channel for communicating data to be stored on or read from the recording media, wherein the communications channel further comprises a sampler for sampling a preamble comprising a known string of data bits, a first calculator for estimating the sampled preamble ($\hat{Y}$), a second calculator for calculating a plurality of cost functions (C($\hat{f}$, $\hat{\Phi}$)) as a function of the estimated frequency ($\hat{f}$) and the estimated phase ($\hat{\Phi}$) by varying at least one of the estimated frequency ($\hat{f}$) or estimated phase ($\hat{\Phi}$), and a selector for determining the cost function (C($\hat{f}$, $\hat{\Phi}$)) having a minimum value, wherein said cost function having the minimum value is a function of an optimal estimated frequency ($\hat{f}$) and an optimal estimated phase ($\hat{\Phi}$), and wherein the estimated preamble further comprises an estimated amplitude ($\hat{A}$), an estimated frequency ($\hat{f}$), and an estimated phase ($\hat{\Phi}$), wherein the selector determines the minimum value cost function by selecting a plurality of first minimum cost functions such that each of the first minimum cost functions has a different estimated frequency ($\hat{f}$).

10. The system of claim 9, wherein the selector determines the minimum value cost function by selecting a second minimum cost function from the plurality of first minimum cost functions, and wherein the second minimum cost function is a function of an optimal estimated frequency ($\hat{f}$) and an optimal estimated phase ($\hat{\Phi}$).

11. A disk drive system for an optimal one-shot phase and frequency estimation for timing acquisition for signals transmitted over a communications channel, the system comprising:
- rotating magnetic media for storing data;
- a motor for rotating the magnetic media;
- a recording head for transmitting data;
- an actuator for positioning the recording head; and
- a communications channel for communicating data to be stored on or read from the recording media, wherein the communications channel further comprises a sampler for sampling a preamble comprising a known string of data bits, a first calculator for estimating the sampled preamble ($\hat{Y}$), a second calculator for calculating a plurality of cost functions (C($\hat{f}$, $\hat{\Phi}$)) as a function of the estimated frequency ($\hat{f}$) and the estimated phase ($\hat{\Phi}$) by varying at least one of the estimated frequency ($\hat{f}$) or estimated phase ($\hat{\Phi}$), and a selector for determining the cost function (C($\hat{f}$, $\hat{\Phi}$)) having a minimum value, wherein said cost function having the minimum value is a function of an optimal estimated frequency ($\hat{f}$) and an optimal estimated phase ($\hat{\Phi}$), and wherein the estimated preamble further comprises an estimated amplitude ($\hat{A}$), an estimated frequency ($\hat{f}$), and an estimated phase ($\hat{\Phi}$), wherein the selector determines the cost minimum value function by selecting a plurality of first minimum cost functions such that each of the first minimum cost functions has a different estimated phase ($\hat{\Phi}$).

12. The system of claim 11, wherein the selector determines the minimum value cost function by selecting a second minimum cost function from the plurality of first minimum cost functions, and wherein the second minimum cost function is a function of an optimal estimated frequency ($\hat{f}$) and an optimal estimated phase ($\hat{\Phi}$).

13. A communications channel for an optimal one-shot phase and frequency estimation for timing acquisition for signals transmitted over the communications channel, the communications channel comprising:
- a means for sampling a preamble comprising a known string of data bits;
- a means for estimating the sampled preamble ($\hat{Y}$), the estimated preamble further comprising an estimated amplitude ($\hat{A}$), an estimated frequency ($\hat{f}$), and an estimated phase ($\hat{\Phi}$);
- means for calculating a plurality of cost functions (C($\hat{f}$, $\hat{\Phi}$)) as a function of the estimated frequency ($\hat{f}$) and the estimated phase ($\hat{\Phi}$) by varying at least one of the estimated frequency ($\hat{f}$) or estimated phase ($\hat{\Phi}$); and
- a means for selecting the cost function (C($\hat{f}$, $\hat{\Phi}$)) having a minimum value, wherein said cost function having the minimum value is a function of an optimal estimated frequency ($\hat{f}$) and an optimal estimated phase ($\hat{\Phi}$) wherein means for selecting selects the minimum value cost function by selecting a plurality of first minimum cost functions such that each of the first minimum cost functions has a different estimated frequency ($\hat{f}$).

14. The communications channel of claim 13, wherein the means for selecting selects the minimum value cost function by selecting a second minimum cost function from the plurality of first minimum cost functions, and wherein the second minimum cost function is a function of an optimal estimated frequency ($\hat{f}$) and an optimal estimated phase ($\hat{\Phi}$).

15. A communications channel for an optimal one-shot phase and frequency estimation for timing acquisition for signals transmitted over the communications channel, the communications channel comprising:
   a means for sampling a preamble comprising a known string of data bits;
   a means for estimating the sampled preamble ($\overline{Y}$), the estimated preamble further comprising an estimated amplitude ($\hat{A}$), an estimated frequency ($\hat{f}$), and an estimated phase ($\hat{\Phi}$);
   a means for calculating a plurality of cost functions (C($\hat{f}$, $\hat{\Phi}$)) as a function of the estimated frequency ($\hat{f}$) and the estimated phase ($\hat{\Phi}$) by varying at least one of the estimated frequency ($\hat{f}$) or estimated phase ($\hat{\Phi}$); and
   a means for selecting the cost function (C($\hat{f}$, $\hat{\Phi}$)) having a minimum value, wherein said cost function having the minimum value is a function of an optimal estimated frequency ($\hat{f}$) and an optimal estimated phase ($\hat{\Phi}$), wherein the means for selecting selects the minimum value cost function by selecting a plurality of first minimum cost functions such that each of the first minimum cost functions has a different estimated phase ($\hat{\Phi}$).

16. The communications channel of claim 15, wherein the means for selecting selects the minimum value cost function by selecting a second minimum cost function from the plurality of first minimum cost functions, and wherein the second minimum cost function is a function of an optimal estimated frequency ($\hat{f}$) and an optimal estimated phase ($\hat{\Phi}$).

17. A computer program product encoded with a computer program for performing a method for an optimal one-sot phase and frequency estimation for timing acquisition for signals transmitted over a communications channel, the method comprising:
   sampling a preamble comprising a known string of data bits;
   estimating the sampled preamble ($\overline{Y}$), the estimated preamble further comprising an estimated amplitude ($\hat{A}$), an estimated frequency ($\hat{f}$), and an estimated phase ($\hat{\Phi}$);
   calculating a cost function (C($\hat{f}$, $\hat{\Phi}$)) as a function of the estimated frequency ($\hat{f}$) and the estimated phase ($\hat{\Phi}$);
   varying at least one of the estimated frequency ($\hat{f}$) or estimated phase ($\hat{\Phi}$) to calculate a plurality of cost functions; and
   selecting the cost function (C($\hat{f}$, $\hat{\Phi}$)) having a minimum value, wherein said cost function having the minimum value is a function of an optimal estimated frequency ($\hat{f}$) and an optimal estimated phase ($\hat{\Phi}$), wherein selecting the minimum value cost function further comprises selecting a plurality of first minimum cost functions such that each of the first minimum cost functions has a different estimated frequency ($\hat{f}$).

18. The computer program product of claim 17, wherein selecting the minimum value cost function further comprises selecting a second minimum cost function from the plurality of first minimum cost functions, and wherein the second minimum cost function is a function of an optimal estimated frequency ($\hat{f}$) and an optimal estimated phase ($\hat{\Phi}$).

19. A computer program product encoded with a computer program for performing a method for an optimal one-shot phase and frequency estimation for timing acquisition for signals transmitted over a communications channel, the method comprising:
   sampling a preamble comprising a known string of data bits;
   estimating the sampled preamble ($\overline{Y}$), the estimated preamble further comprising an estimated amplitude ($\hat{A}$), an estimated frequency ($\hat{f}$), and an estimated phase ($\hat{\Phi}$);
   calculating a cost function (C($\hat{f}$, $\hat{\Phi}$)) as a function of the estimated frequency ($\hat{f}$) and the estimated phase ($\hat{\Phi}$);
   varying at least one of the estimated frequency ($\hat{f}$) or estimated phase ($\hat{\Phi}$) to calculate a plurality of cost functions; and
   selecting the cost function (C($\hat{f}$, $\hat{\Phi}$)) having a minimum value, wherein said cost function having the minimum value is a function of an optimal estimated frequency ($\hat{f}$) and an optimal estimated phase ($\hat{\Phi}$), wherein selecting the minimum value cost function further comprises selecting a plurality of first minimum cost functions such that each of the first minimum cost functions has a different estimated phase ($\hat{\Phi}$).

20. The computer program product of claim 19, wherein selecting the minimum value cost function further comprises selecting a second minimum cost function from the plurality of first minimum cost functions, and wherein the second minimum cost function is a function of an optimal estimated frequency ($\hat{f}$) and an optimal estimated phase ($\hat{\Phi}$).

21. A disk drive system for an optimal one-shot phase and frequency estimation for timing acquisition for signals transmitted over a communications channel, the system comprising:
   means for storing data;
   means for rotating the means for storing;
   means for transmitting data to and from the means for storing;
   means for positioning the means for transmitting data; and
   means for communicating data to be stored on or read from the means for storing, wherein said means for communicating further comprises means for sampling a preamble comprising a known string of data bits, means for estimating the sampled preamble ($\overline{Y}$), means for calculating a plurality of cost functions (C($\hat{f}$, $\hat{\Phi}$)) as a function of the estimated frequency ($\hat{f}$) and the estimated phase ($\hat{\Phi}$) by varying at least one of the estimated frequency ($\hat{f}$) or estimated phase ($\hat{\Phi}$), and means for determining the cost function (C($\hat{f}$, $\hat{\Phi}$)) having a minimum value, wherein said cost function having the minimum value is a function of an optimal estimated frequency ($\hat{f}$) and an optimal estimated phase ($\hat{\Phi}$), and wherein the estimated preamble further comprises an estimated amplitude ($\hat{A}$), an estimated frequency ($\hat{f}$), and an estimated phase ($\hat{\Phi}$), wherein the means for selecting determines the minimum value cost function by selecting a plurality of first minimum cost functions such that each of the first minimum cost functions has a different estimated frequency ($\hat{f}$).

22. The system of claim 21, wherein the means for selecting determines the minimum value cost function by selecting a second minimum cost function from the plurality of first minimum cost functions, and wherein the second minimum cost function is a function of an optimal estimated frequency ($\hat{f}$) and an optimal estimated phase ($\hat{\Phi}$).

23. A disk drive system for an optimal one-shot phase and frequency estimation for timing acquisition for signals transmitted over a communications channel, the system comprising:
   means for storing data;

means for rotating the means for storing;

means for transmitting data to and from the means for storing;

means for positioning the means for transmitting data; and means for communicating data to be stored on or read from the means for storing, wherein said means for communicating further comprises means for sampling a preamble comprising a known string of data bits, means for estimating the sampled preamble ($\Upsilon$), means for calculating a plurality of cost functions ($C(\hat{f}, \hat{\Phi})$) as a function of the estimated frequency ($\hat{f}$) and the estimated phase ($\hat{\Phi}$) by varying at least one of the estimated frequency ($\hat{f}$) or estimated phase ($\hat{\Phi}$), and means for determining the cost function ($C(\hat{f}, \hat{\Phi})$) having a minimum value, wherein said cost function having the minimum value is a function of an optimal estimated frequency ($\hat{f}$) and an optimal estimated phase ($\hat{\Phi}$), and wherein the estimated preamble further comprises an estimated amplitude ($\hat{A}$), an estimated frequency ($\hat{f}$), and an estimated phase ($\hat{\Phi}$), wherein the means for selecting determines the minimum value cost function by selecting a plurality of first minimum cost functions such that each of the first minimum cost functions has a different estimated phase ($\hat{\Phi}$).

24. The system of claim 23, wherein the means for selecting determines the minimum value cost function by selecting a second minimum cost function from the plurality of first minimum cost functions, and wherein the second minimum cost function is a function of an optimal estimated frequency ($\hat{f}$) and an optimal estimated phase ($\hat{\Phi}$).

* * * * *